(12) United States Patent
Soma et al.

(10) Patent No.: US 11,233,432 B2
(45) Date of Patent: Jan. 25, 2022

(54) ROTOR

(71) Applicant: HONDA MOTOR CO., LTD., Tokyo (JP)

(72) Inventors: Shingo Soma, Saitama (JP); Yoshihisa Kubota, Saitama (JP); Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 16/702,851

(22) Filed: Dec. 4, 2019

(65) Prior Publication Data

US 2020/0185991 A1 Jun. 11, 2020

(30) Foreign Application Priority Data

Dec. 10, 2018 (JP) .............................. JP2018-231023

(51) Int. Cl.
*H02K 1/27* (2006.01)
*H02K 1/28* (2006.01)

(52) U.S. Cl.
CPC ............... *H02K 1/28* (2013.01); *H02K 1/276* (2013.01)

(58) Field of Classification Search
CPC H02K 1/28; H02K 1/276; H02K 1/32; H02K 1/2766; H02K 1/27
See application file for complete search history.

(56) References Cited

U.S. PATENT DOCUMENTS

| 8,362,661 | B2 | 1/2013 | DeBlock et al. |
| 9,899,897 | B2 | 2/2018 | Baba et al. |
| 2012/0086291 | A1 | 4/2012 | DeBlock et al. |
| 2015/0115758 | A1* | 4/2015 | Koka ................ B60L 50/51 310/156.07 |
| 2015/0318764 | A1 | 11/2015 | Baba et al. |
| 2016/0006307 | A1* | 1/2016 | Yokota ............. H02K 1/2766 310/59 |

(Continued)

FOREIGN PATENT DOCUMENTS

| CN | 104871409 A | 8/2015 |
| CN | 108847731 A | 11/2018 |

(Continued)

OTHER PUBLICATIONS

Oct. 19, 2021 Chinese Office Action issued for related CN application No. 201911232050.1.

(Continued)

*Primary Examiner* — Thomas Truong (74) *Attorney, Agent, or Firm* — Paratus Law Group, PLLC (57) ABSTRACT

A rotor includes: a rotor core including a rotor shaft hole in which a rotor shaft is fastened, a plurality of magnet insertion holes provided along the circumferential direction, and a hollow hole provided between the rotor shaft hole and the magnet insertion holes in the radial direction; and a plurality of magnetic pole portions constituted by permanent magnets inserted into the magnet insertion holes. The hollow hole includes an intersection of the q-axis of each magnetic pole portion and a virtual circle passing through the innermost diameter portion of the magnet insertion holes around the axis of the rotor core, and the hollow hole is disposed to face the magnet insertion holes of adjacent magnetic pole portions.

5 Claims, 4 Drawing Sheets

(56) References Cited

U.S. PATENT DOCUMENTS

2020/0127511 A1\* 4/2020 Matsubara .......... H02K 1/2766

FOREIGN PATENT DOCUMENTS

| JP | 2006-314152 A | 11/2006 |
|----|---------------|---------|
| JP | 2010-081657 A | 4/2010 |
| JP | 2012-085517 A | 4/2012 |
| JP | 2012-143128 A | 7/2012 |
| JP | 2015-053822 A | 3/2015 |
| JP | 2017-184343 A | 10/2017 |

OTHER PUBLICATIONS

Nov. 2, 2021 Japanese Office Action issued for related JP application No. 2018-231023.

\* cited by examiner

ROTOR

CROSS-REFERENCE TO RELATED APPLICATIONS

The present application claims the benefit of priority of Japanese Patent Application No. 2018-231023, filed on Dec. 10, 2018, the content of which is incorporated herein by reference.

TECHNICAL FIELD

The present invention relates to a rotor used in the rotating electrical machine.

BACKGROUND ART

JP-A-2010-081657 discloses a rotor including a rotor shaft hole in which a rotor shaft is fastened, a refrigerant flow path hole that is provided outside the rotor shaft hole in the radial direction and has a plurality of holes arranged in the circumferential direction, and an electromagnetic unit that is provided outside the refrigerant flow path hole in the radial direction and has a plurality of magnet insertion holes into which respective magnets are inserted.

JP-A-2010-081657 describes that the refrigerant flowing through the refrigerant flow path hole provided in the rotor core is supplied to the coil end using the centrifugal force generated by the rotation of the rotor.

Meanwhile, with the recent increase in the size of rotating electrical machines, the degradation in the performance of rotating electrical machines due to the heat generated by magnets cannot be ignored, and methods for efficiently cooling magnets are being sought. In the rotor described in JP-A-2010-081657, the magnet disposed on the rotor cannot be cooled appropriately. In order to cool the magnet appropriately, it is necessary to make the refrigerant flow path hole close to the magnet. However, if the refrigerant supply hole is arranged in the vicinity of the magnetic pole portion, the refrigerant supply hole is deformed by the tightening load to the rotor shaft hole of the rotor shaft, and there is a possibility that the outer peripheral portion of the rotor core is deformed.

SUMMARY

The present invention provides a rotor capable of reducing the stress generated in a magnetic pole portion due to a tightening load of a rotor shaft while cooling a permanent magnet.

According to an aspect of the present invention, there is provided a rotor including: a rotor core including a rotor shaft hole in which a rotor shaft is fastened, a plurality of magnet insertion holes provided along the circumferential direction, and a hollow hole provided between the rotor shaft hole and the magnet insertion holes in the radial direction; and a plurality of magnetic pole portions constituted by permanent magnets inserted into the magnet insertion holes, wherein: the hollow hole includes an intersection of the q-axis of each magnetic pole portion and a virtual circle passing through the innermost diameter portion of the magnet insertion holes around the axis of the rotor core; and the hollow hole is disposed to face the magnet insertion holes of adjacent magnetic pole portions.

EFFECTS

According to the present invention, the stress which arises in a magnetic pole portion due to a tightening load of a rotor shaft can be reduced while cooling a permanent magnet.

DESCRIPTION OF EMBODIMENTS

Hereinafter, embodiments of the rotor of the present invention will be described with reference to the accompanying drawings.

First Embodiment

First, a rotor according to a first embodiment of the present invention will be described with reference to FIGS. 1 and 2A.

[Overall Configuration of Rotor]

Figure 1:
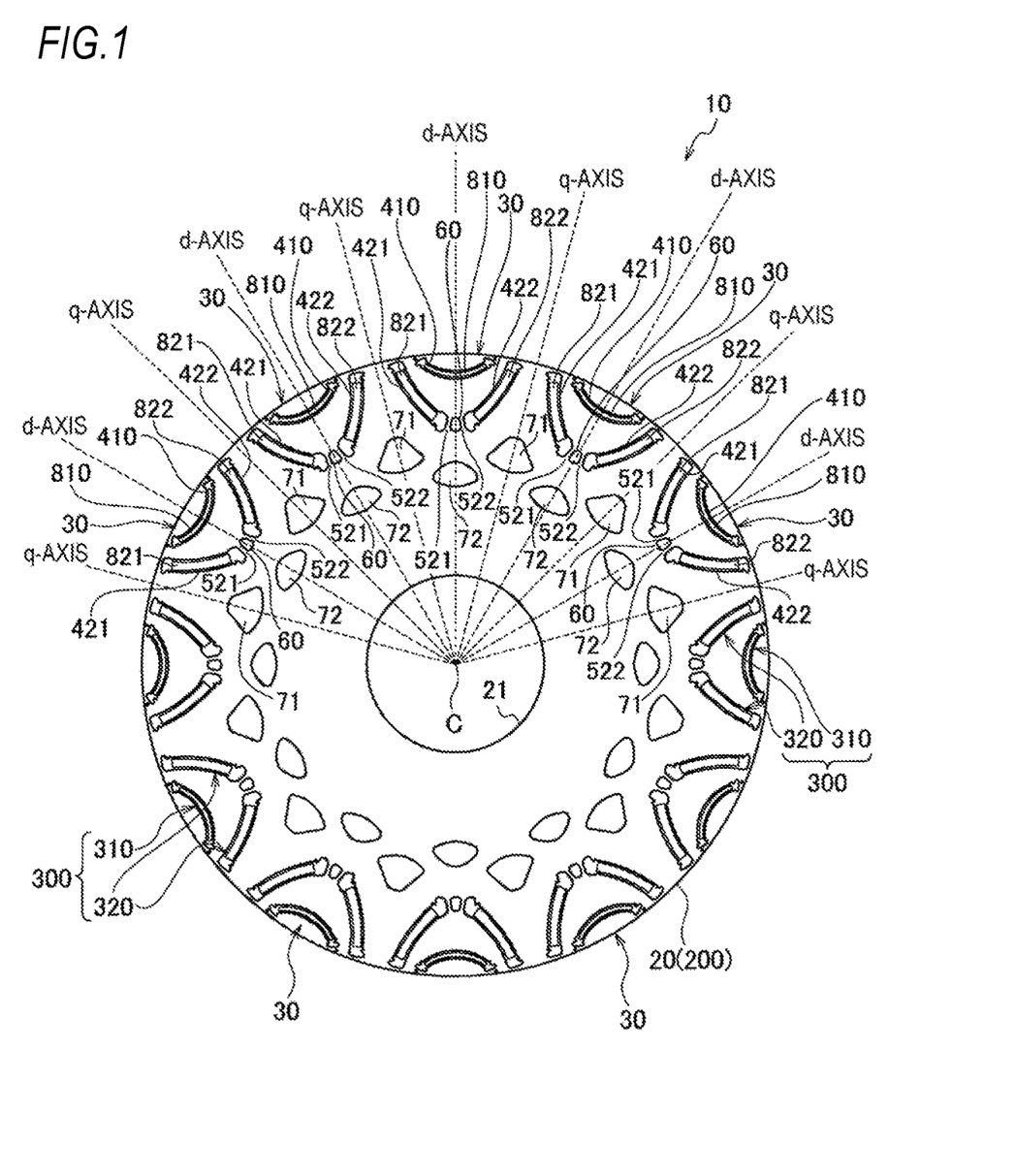
FIG. 1 is a front view of a rotor according to the first embodiment of the present invention.

As illustrated in FIG. 1, a rotor 10 of a rotating electrical machine of one embodiment includes a rotor core 20 attached to an outer peripheral portion of a rotor shaft (not illustrated), and a plurality of magnetic pole portions 30 (12 in this embodiment) formed inside the rotor core 20 at predetermined intervals in the circumferential direction, and the rotor 10 is arranged on the inner peripheral side of a stator (not illustrated).

The rotor core 20 is formed by laminating a plurality of substantially annular electromagnetic steel plates 200 having the same shape in the axial direction. The rotor core 20 includes a rotor shaft hole 21 concentric with an axial center C. Furthermore, when the central axis of each magnetic pole portion 30, which connects the axial center C and the center of each magnetic pole portion 30, is set as the d-axis (d-axis in the drawing) and the axis separated from the d-axis by 90 electrical degrees is set as the q-axis (q-axis in the drawing), the rotor core 20 includes a first refrigerant flow path hole 71 formed on the q-axis and a second refrigerant flow path hole 72 formed on the d-axis on the radially inner side of the magnetic pole portion 30.

The first refrigerant flow path hole 71 and the second refrigerant flow path hole 72 communicate with a refrigerant supply path (not illustrated) provided inside the rotor shaft (not illustrated), and the refrigerant as the liquid medium flows from one side of the first refrigerant flow path hole 71 and the second refrigerant flow path hole 72 to the other side thereof in the axial direction, thereby cooling the magnetic pole portions 30 arranged in each of the magnetic pole portions 30. As a result, the refrigerant flow path can be formed in the vicinity of the magnetic pole portion 30 and thus, the cooling performance of the rotor 10 is improved.

The refrigerant may cool the magnetic pole portions 30 by flowing from the centers of the first refrigerant flow path holes 71 and the second refrigerant flow path holes 72 to both sides thereof in the axial direction. The refrigerant that has cooled each magnetic pole portion 30 may be discharged from the end surface of the rotor core 20 to the outside thereof, or may be returned to the rotor shaft.

Further, the rotor core 20 includes an outer diameter side magnet insertion hole 410 formed on the outer diameter side of the rotor core 20 so as to cross the d-axis; a pair of inner diameter side magnet insertion holes 421 and 422 formed in a substantially V-shape extending outward in the radial direction across the d-axis on the inner diameter side of the outer diameter side magnet insertion hole 410; a pair of ribs 510 and 520 formed in the d-axis side end portions of the inner diameter side magnet insertion holes 421 and 422 and respectively extending in the radial direction; and a gap portion 60 formed between the pair of ribs 510 and 520, so as to correspond to each magnetic pole portion 30. Each of the outer diameter side magnet insertion hole 410 and the inner diameter side magnet insertion holes 421 and 422 has an arc shape that protrudes radially inward.

Each magnetic pole portion 30 includes a magnet part 300 including an outer diameter side magnet part 310 and an inner diameter side magnet part 320. The outer diameter side magnet part 310 is configured by an outer diameter side arc magnet 810 that is inserted into the outer diameter side magnet insertion hole 410 and arranged to protrude radially inward. The inner diameter side magnet part 320 is configured by a pair of inner diameter side arc magnets 821 and 822 that are inserted into the pair of inner diameter side magnet insertion holes 421 and 422, respectively, and arranged to protrude radially inward.

The outer diameter side arc magnet 810 and the pair of inner diameter side arc magnets 821 and 822 are magnetized in the radial direction. Also, the outer diameter side arc magnet 810 and the pair of inner diameter side arc magnets 821 and 822 are arranged so that the magnetization directions thereof are different from that of the adjacent magnetic pole portion 30, and the magnetization directions of the magnetic pole portions 30 are alternately different in the circumferential direction.

Here, in the front view of the rotor 10, when the axial center C is set as the lower side and the outer diameter side in the d-axis direction is set as the upper side, the pair of inner diameter side magnet insertion holes 421 and 422 are arranged with a first inner diameter side magnet insertion hole 421 on the left side and a second inner diameter side magnet insertion hole 422 on the right side with respect to the d-axis, and the pair of ribs 510 and 520 are arranged with a first rib 510 on the left side and a second rib 520 on the right side across the d-axis. The pair of inner diameter side arc magnets 821 and 822 are arranged with a first inner diameter side arc magnet 821 on the left side and a second inner diameter side arc magnet 822 on the right side across the d-axis.

Hereinafter, in the present specification and the like, in order to simplify and clarify the description, in the front view of the rotor 10, the axial center C is defined as the lower side and the outer diameter side in the d-axis direction is defined as the upper side. In FIGS. 2A and 2B, the upper side of the rotor 10 is indicated as U, the lower side as D, the left side as L, and the right side as R.

[Configuration of Magnetic Pole Portion]

Figure 2A:
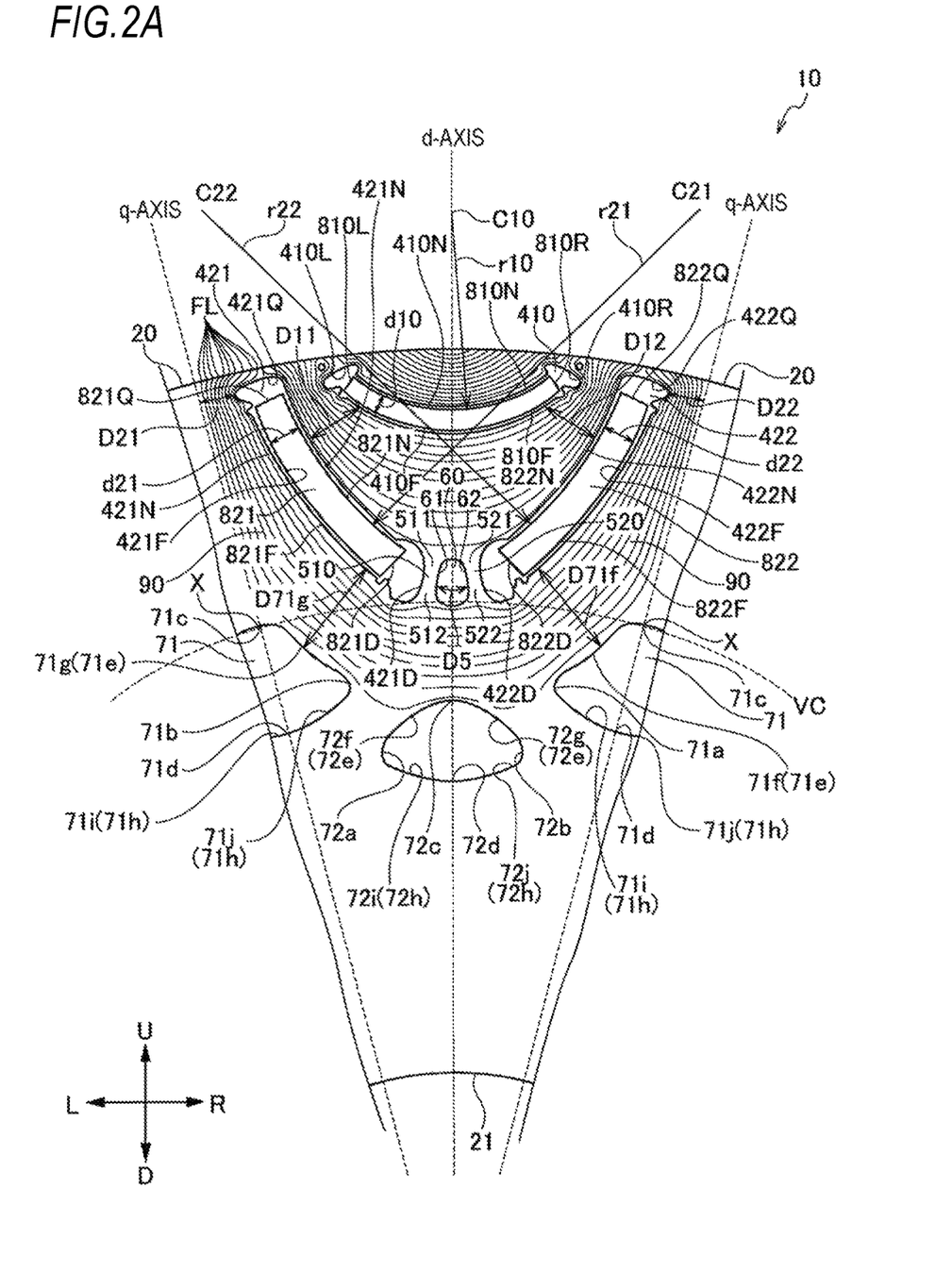
FIG. 2A is an enlarged view around a magnetic pole portion of the rotor of FIG. 1.
Figure 2B:
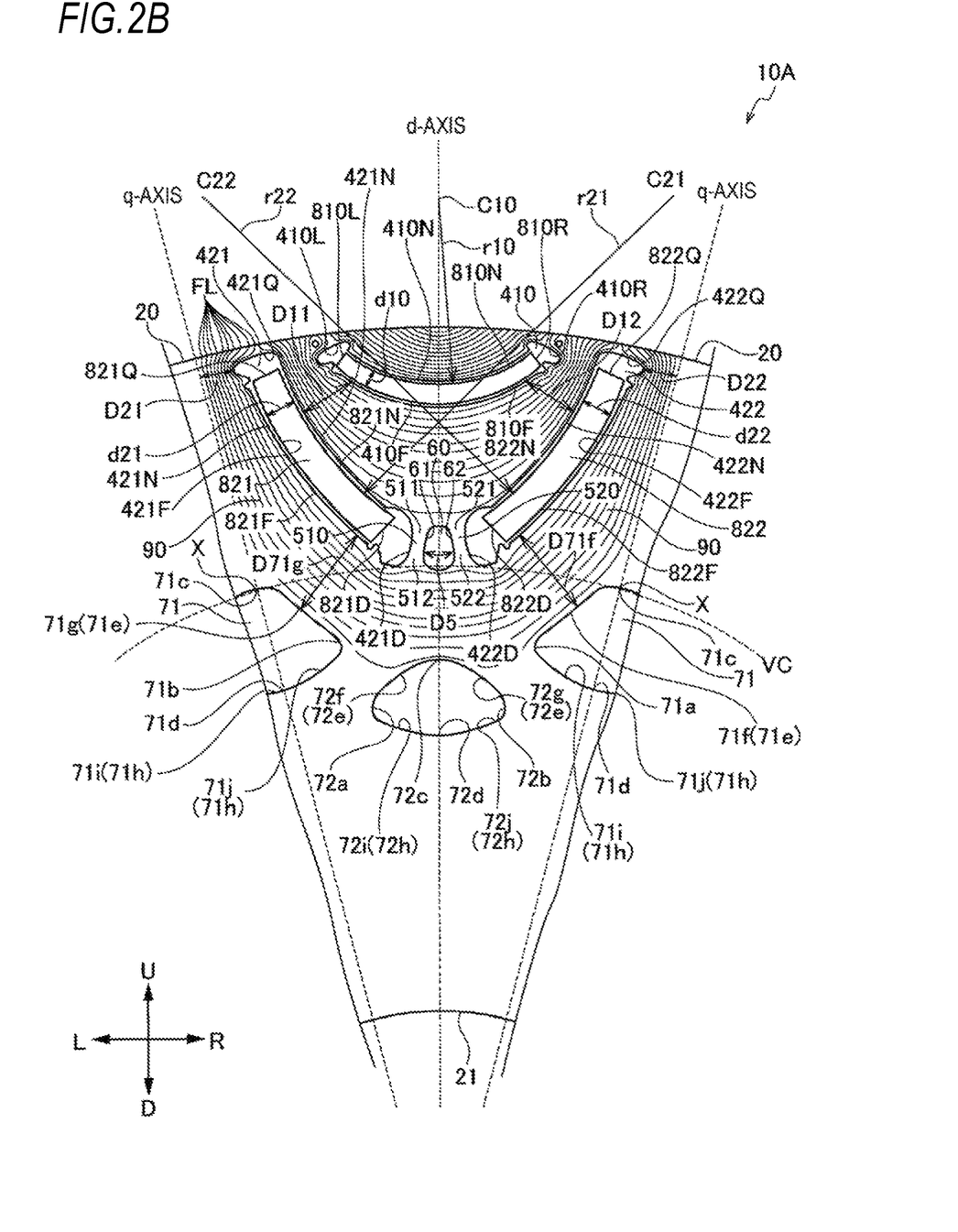
FIG. 2B is an enlarged view around a magnetic pole portion of a rotor according to a second embodiment of the present invention.

As illustrated in FIG. 2A, the outer diameter side arc magnet 810 includes an inner peripheral surface 810N and an outer peripheral surface 810F having the same arc center C10, a left side end surface 810L, and a right side end surface 810R. The first inner diameter side arc magnet 821 includes an inner peripheral surface 821N and an outer peripheral surface 821F having the same arc center C21, a q-axis side end surface 821Q, and a d-axis side end surface 821D. The arc center C21 of the first inner diameter side arc magnet 821 is located on the right side opposite to the first inner diameter side arc magnet 821 with respect to the d-axis. The second inner diameter side arc magnet 822 includes an inner peripheral surface 822N and an outer peripheral surface 822F having the same arc center C22, a q-axis side end surface 822Q, and a d-axis side end surface 822D. The arc center C22 of the second inner diameter side arc magnet 822 is located on the left side opposite to the second inner diameter side arc magnet 822 with respect to the d-axis.

As the outer diameter side arc magnet 810, the first inner diameter side arc magnet 821, and the second inner diameter side arc magnet 822, for example, arc magnets obtained by cutting a ring-shaped magnet formed by molding using a hot working process in the radial direction can be used.

In general, when forming a ring-shaped magnet by molding using a hot working process such as hot extrusion molding, by hot extrusion molding, a stress acts on a crystal group of randomly oriented ring-shaped magnet material in the radial direction and the crystal group of the ring-shaped magnet material is oriented in the same direction as the stress direction. As a result, an anisotropic ring-shaped magnet oriented in the radial direction is obtained.

Therefore, in order to obtain a ring-shaped magnet having high-performance magnetization characteristics, it is desirable that the stress acting on the crystal group of the ring-shaped magnet material is uniform over the entire area. However, if the ring radius of the ring-shaped magnet material is small and the wall thickness of the ring-shaped magnet material is large, the stress acting on the crystal group of the ring-shaped magnet material becomes uneven and the degree of orientation of the ring-shaped magnet decreases. In addition, even when the wall thickness of the ring-shaped magnet material is not uniform, the stress acting on the crystal group of the ring-shaped magnet material becomes uneven, and the degree of orientation of the ring-shaped magnet decreases. Therefore, in order for the stress acting on the crystal group of the ring-shaped magnet material to be uniform over the entire area, the value of (wall thickness of the ring-shaped magnet material)/(ring radius of the ring-shaped magnet material) needs to be within a predetermined range. When increasing the magnet amount of arc magnets, in order to arrange arc magnets having high-performance magnetization characteristics in a plurality of layers, it is necessary to increase the arc radius of arc magnets according to the plate thickness.

A plate thickness d21 of the first inner diameter side arc magnet 821 and a plate thickness d22 of the second inner diameter side arc magnet 822 are larger than a plate thickness d10 of the outer diameter side arc magnet 810. As a result, since the magnet amount of the first inner diameter side arc magnet 821 and the second inner diameter side arc magnet 822 can be increased and the magnet torque of the rotating electrical machine can be increased, the output performance of the rotating electrical machine can be improved.

Further, by increasing the plate thickness d21 of the first inner diameter side arc magnet 821 and the plate thickness d22 of the second inner diameter side arc magnet 822, an arc radius r21 of the inner peripheral surface 821N of the first inner diameter side arc magnet 821 and an arc radius r22 of the inner peripheral surface 822N of the second inner diameter side arc magnet 822 become larger than an arc radius r10 of the inner peripheral surface 810N of the outer diameter side arc magnet 810. Thus, since the outer diameter side arc magnet 810, the first inner diameter side arc magnet 821, and the second inner diameter side arc magnet 822 having high-performance magnetization characteristics can be used, the output performance of the rotating electrical machine can be improved.

Here, preferably, d10/r10 which is the ratio of the arc radius r10 of the inner peripheral surface 810N of the outer diameter side arc magnet 810 and the plate thickness d10 of the outer diameter side arc magnet 810, d21/r21 which is the ratio of the arc radius r21 of the inner peripheral surface 821N of the first inner diameter side arc magnet 821 and the plate thickness d21 of the first inner diameter side arc magnet 821, and d22/r22 which is the ratio of the arc radius r22 of the inner peripheral surface 822N of the second inner diameter side arc magnet 822 and the plate thickness d22 of the second inner diameter side arc magnet 822 are substantially the same value within a predetermined range. More preferably, the arc radius r21 of the inner peripheral surface 821N of the first inner diameter side arc magnet 821 and the arc radius r22 of the inner peripheral surface 822N of the second inner diameter side arc magnet 822 are the same, and the plate thickness d21 of the first inner diameter side arc magnet 821 and the plate thickness d22 of the second inner diameter side arc magnet 822 are the same, and further, the first inner diameter side arc magnet 821 and the second inner diameter side arc magnet 822 have the same shape.

Furthermore, both a distance D11 between the first inner diameter side arc magnet 821 and the outer diameter side arc magnet 810 and a distance D12 between the second inner diameter side arc magnet 822 and the outer diameter side arc magnet 810 increase as closer from the q-axis to the d-axis.

As a result, since the increase in the length of the magnetic pole portion 30 in the circumferential direction can be suppressed, the increase in the size of the rotor 10 can be suppressed. Therefore, when increasing the magnet amount of the first inner diameter side arc magnet 821 and the second inner diameter side arc magnet 822, the rotor 10 can use the outer diameter side arc magnet 810, the first inner diameter side arc magnet 821 and the second inner diameter side arc magnet 822 having high-performance magnetization characteristics while suppressing an increase in size. In addition, since the magnetic path along the q-axis in the rotor 10 (hereinafter, also referred to as the q-axis magnetic path) can be widened and the reluctance torque of the rotating electrical machine can be increased, the output performance of the rotating electrical machine can be improved. Furthermore, the magnetic flux due to the first inner diameter side arc magnet 821 and the second inner diameter side arc magnet 822, and the outer diameter side arc magnet 810 is easily concentrated on the d-axis, and the magnet torque of the rotating electrical machine can be efficiently used. The output performance of the rotating electrical machine can be improved.

The arc center C10 of the outer diameter side arc magnet 810 is located on the d-axis. As a result, the outer diameter side magnet part 310 can be configured with a single arc magnet, and further, the outer diameter side magnet part 310 can be formed symmetrically with respect to the d-axis. Therefore, the magnet torque can be efficiently obtained with a simple structure.

Further, the arc center C21 of the first inner diameter side arc magnet 821 and the arc center C22 of the second inner diameter side arc magnet 822 are located symmetrically with respect to the d-axis. Accordingly, since the inner diameter side magnet part 320 can be formed symmetrically with respect to the d-axis, an efficient arrangement for obtaining reluctance torque can be achieved.

The outer diameter side magnet insertion hole 410 includes an inner peripheral wall surface 410N and an outer peripheral wall surface 410F formed along the inner peripheral surface 810N and the outer peripheral surface 810F of the outer diameter side arc magnet 810, a left side wall surface 410L, and a right side wall surface 410R. The first inner diameter side magnet insertion hole 421 includes an inner peripheral wall surface 421N and an outer peripheral wall surface 421F formed along the inner peripheral surface 821N and the outer peripheral surface 821F of the first inner diameter side arc magnet 821, a q-axis side wall surface 421Q, and a d-axis side wall surface 421D. The second inner diameter side magnet insertion hole 422 includes an inner peripheral wall surface 422N and an outer peripheral wall surface 422F formed along the inner peripheral surface 822N and the outer peripheral surface 822F of the second inner diameter side arc magnet 822, a q-axis side wall surface 422Q, and a d-axis side wall surface 422D.

Further, the first rib 510 extending in the radial direction is formed between the d-axis side end surface 821D of the first inner diameter side arc magnet 821 and the d-axis, and a second rib 520 extending in the radial direction is formed between the d-axis side end surface 822D of the second inner diameter side arc magnet 822 and the d-axis. Further, the gap portion 60 is formed between the first rib 510 and the second rib 520. Therefore, the gap portion 60 is provided to overlap the d-axis.

As a result, in the inner diameter side magnet part 320, a gap is formed on the d-axis, and thus, the d-axis inductance can be reduced. Therefore, since the difference between the d-axis inductance and the q-axis inductance can be increased, the reluctance torque can be used effectively, and the output performance of the rotating electrical machine can be improved.

The first rib 510 is constituted by the d-axis side wall surface 421D of the first inner diameter side magnet insertion hole 421 and a left side wall surface 61 of the gap portion 60. The second rib 520 is constituted by the d-axis side wall surface 422D of the second inner diameter side magnet insertion hole 422 and a right side wall surface 62 of the gap portion 60.

Therefore, the first rib 510 receives a centrifugal load by the first inner diameter side arc magnet 821, and the second rib 520 receives a centrifugal load by the second inner diameter side arc magnet 822. That is, the first rib 510 and the second rib 520 separately receive the centrifugal load from the first inner diameter side arc magnet 821 and the centrifugal load from the second inner diameter side arc magnet 822, respectively. As a result, the bending stress generated in the rotor core 20 due to the weight variation of the first inner diameter side arc magnet 821 and the second inner diameter side arc magnet 822 can be reduced.

Further, the first rib 510 and the second rib 520 are provided in a substantially V shape in which a distance D5 between the first rib 510 and the second rib 520 increases toward the inner side in the radial direction. As a result, a radially outer side end portion 511 and a radially inner side end portion 512 of the first rib 510 and a radially outer side end portion 521 and a radially inner side end portion 522 of the second rib 520 both can increase an angle R. Therefore, the stress concentration at both end portions in the radial direction of the first rib 510 and the second rib 520 can be reduced.

Here, the gap portion 60 may be supplied with a refrigerant. Thus, since the refrigerant can be supplied in the vicinity of the outer diameter side arc magnet 810, the first inner diameter side arc magnet 821 and the second inner diameter side arc magnet 822, it is possible to cool the outer diameter side arc magnet 810, the first inner diameter side arc magnet 821 and the second inner diameter side arc magnet 822 more effectively.

[Configuration of Refrigerant Supply Hole]

The first refrigerant flow path hole 71 has a substantially quadrangular shape that protrudes toward both sides in the circumferential direction and both sides in the radial direction. The first refrigerant flow path hole 71 includes a left end portion 71a and a right end portion 71b forming both end portions in the circumferential direction, an outer diameter side apex 71c that is disposed on the q-axis, has a longer radial distance from the axial center C of the rotor core 20 than the left end portion 71a and the right end portion 71b, and forms an apex on the outer side in the radial direction, and an inner diameter side apex 71d that is disposed on the q-axis, has a shorter radial distance from the axial center C of the rotor core 20 than the left end portion 71a and the right end portion 71b, and forms an apex on the inner side in the radial direction.

Further, the first refrigerant flow path hole 71 includes an outer diameter wall 71e including a left outer diameter wall 71f extending from the left end portion 71a to the outer diameter side apex 71c and a right outer diameter wall 71g extending from the right end portion 71b to the outer diameter side apex 71c. In addition, the first refrigerant flow path hole 71 includes an inner diameter wall 71h including a left inner diameter wall 71i extending from the left end portion 71a to the inner diameter side apex 71d and a right inner diameter wall 71j extending from the right end portion 71b to the inner diameter side apex 71d.

The first refrigerant flow path hole 71 is disposed at a position including an intersection X of the q-axis with a virtual circle VC passing through the innermost diameter portion of the pair of inner diameter side magnet insertion holes 421 and 422 around the axial center C of the rotor core 20. As a result, the stress generated in the rotor core 20 due to the tightening load of the rotor shaft can be absorbed by the first refrigerant flow path hole 71, and the stress generated in the magnetic pole portion 30 due to the tightening load of the rotor shaft can be reduced.

More preferably, the first refrigerant flow path hole 71 is disposed at a position where the outer diameter side apex 71c intersects the virtual circle VC. Thus, the distance from the axial center C of the rotor core 20 at the outer diameter side apex 71c of the first refrigerant flow path hole 71 and the distance from the axial center C of the rotor core 20 at the innermost diameter portion of the pair of inner diameter side magnet insertion holes 421 and 422 are substantially the same. Therefore, the stress due to the tightening load of the rotor shaft can be distributed and received at the outer diameter side apex 71c of the first refrigerant flow path hole 71 and the innermost diameter portion of the pair of inner diameter side magnet insertion holes 421 and 422.

Further, the left outer diameter wall 71f of the first refrigerant flow path hole 71 is disposed so as to face the second inner diameter side magnet insertion hole 422 of the adjacent magnetic pole portion 30 across a q-axis magnetic path 90. Similarly, the right outer diameter wall 71g of the first refrigerant flow path hole 71 is disposed so as to face the first inner diameter side magnet insertion hole 421 of the adjacent magnetic pole portion 30 across the q-axis magnetic path 90. As a result, the magnet part 300 constituting the magnetic pole portion 30 can be cooled by the refrigerant flowing through the first refrigerant flow path hole 71.

Further, the left outer diameter wall 71f of the first refrigerant flow path hole 71 has a curved shape protruding toward the center side of the first refrigerant flow path hole 71 more than the outer peripheral wall surface 422F of the second inner diameter side magnet insertion hole 422 facing the left outer diameter wall 71f across the q-axis magnetic path 90. Similarly, the right outer diameter wall 71g of the first refrigerant flow path hole 71 has a curved shape protruding toward the center side of the first refrigerant flow path hole 71 more than the outer peripheral wall surface 421F of the first inner diameter side magnet insertion hole 421 facing the right outer diameter wall 71g across the q-axis magnetic path 90. Therefore, the width of the q-axis magnetic path 90 through which the q-axis magnetic flux flows is ensured, and the decrease in the q-axis inductance can be suppressed. Further, the outer peripheral wall surface 421F of the first inner diameter side magnet insertion hole 421 and the outer peripheral wall surface 422F of the second inner diameter side magnet insertion hole 422 have an arc shape that protrudes inward of the rotor core 20 in the radial direction, and thus, the q-axis magnetic path 90 can be made to have a shape along the flow of a q-axis magnetic flux FL, and a decrease in q-axis inductance can be suppressed.

A distance D71f between the left outer diameter wall 71f of the first refrigerant flow path hole 71 and the outer peripheral wall surface 422F of the second inner diameter side magnet insertion hole 422 facing the left outer diameter wall 71f across the q-axis magnetic path 90, and a distance D71g between the right outer diameter wall 71g of the first refrigerant flow path hole 71 and the outer peripheral wall surface 421F of the first inner diameter side magnet insertion hole 421 facing the right outer diameter wall 71g across the q-axis magnetic path 90 are longer than the distances D22 and D21 between the q-axis, and the second inner diameter side magnet insertion hole 422 and the first inner diameter side magnet insertion hole 421 at the radially outer side end portion of the second inner diameter side magnet insertion hole 422 and the first inner diameter side magnet insertion hole 421.

Thus, since the width of the q-axis magnetic path 90 formed between the first refrigerant flow path hole 71, and the first inner diameter side magnet insertion hole 421 and the second inner diameter side magnet insertion hole 422 opposite to each other is wider than the width of the q-axis magnetic path 90 formed at the radially outer side end portions of the first inner diameter side magnet insertion hole 421 and second inner diameter side magnet insertion hole 422, the q-axis magnetic path 90 through which the q-axis magnetic flux flows can be more effectively ensured.

The second refrigerant flow path hole 72 has a substantially quadrangular shape that protrudes toward both sides in the circumferential direction and both sides in the radial direction. The second refrigerant flow path hole 72 includes a left end portion 72a and a right end portion 72b forming both end portions in the circumferential direction, an outer diameter side apex 72c that is disposed on the d-axis, has a longer radial distance from the axial center C of the rotor core 20 more than the left end portion 72a and the right end portion 72b, and forms an apex on the outer side in the radial direction, and an inner diameter side apex 72d that is disposed on the d-axis, has a shorter radial distance from the axial center C of the rotor core 20 than the left end portion 72a and the right end portion 72b, and forms an apex on the inner side in the radial direction.

Further, the second refrigerant flow path hole 72 includes an outer diameter wall 72e including a left outer diameter wall 72f extending from the left end portion 72a to the outer diameter side apex 72c, and a right outer diameter wall 72g extending from the right end portion 72b to the outer diameter side apex 72c. In addition, the second refrigerant flow path hole 72 includes an inner diameter wall 72h including a left inner diameter wall 72i extending from the left end portion 72a to the inner diameter side apex 72d and a right inner diameter wall 72j extending from the right end portion 72b to the inner diameter side apex 72d.

The second refrigerant flow path hole 72 is arranged such that the outer diameter side apex 72c is disposed between the inner diameter side apex 71d, and the left end portion 71a and the right end portion 71b of the first refrigerant flow path hole 71 in the radial direction. As a result, the stress generated in the rotor core 20 due to the tightening load of the rotor shaft can be distributed and absorbed at the first refrigerant flow path hole 71 and the second refrigerant flow path hole 72, while ensuring the width of the q-axis magnetic path 90 through which the q-axis magnetic flux flows.

The left outer diameter wall 72f of the second refrigerant flow path hole 72 is substantially parallel to the right inner diameter wall 71j of the first refrigerant flow path hole 71 adjacent to the left side of the second refrigerant flow path hole 72. Similarly, the right outer diameter wall 72g of the second refrigerant flow path hole 72 is substantially parallel to the left inner diameter wall 71i of the first refrigerant flow path hole 71 adjacent to the right side of the second refrigerant flow path hole 72.

Second Embodiment

Next, the rotor 10 according to the second embodiment of the present invention will be described with reference to FIG. 2B. In the following description, the same components as those of the rotor 10 of the first embodiment are denoted by the same reference numerals, and the description thereof is omitted or simplified. In the rotor 10 of the first embodiment, the left outer diameter wall 71f of the first refrigerant flow path hole 71 has a curved shape that protrudes toward the center side of the first refrigerant flow path hole 71 more than the outer peripheral wall surface 422F of the second inner diameter side magnet insertion hole 422 facing the left outer diameter wall 71f across the q-axis magnetic path 90.

As illustrated in FIG. 2B, in a rotor 10A of the second embodiment, the left outer diameter wall 71f of the first refrigerant flow path hole 71 has a shape curved along the outer peripheral wall surface 422F of the second inner diameter side magnet insertion hole 422 facing the left outer diameter wall 71f across the q-axis magnetic path 90. In the present embodiment, the outer peripheral wall surface 422F of the second inner diameter side magnet insertion hole 422 has an arc shape along the outer peripheral surface 822F of the second inner diameter side arc magnet 822, and the left outer diameter wall 71f of the first refrigerant flow path hole 71 has an arc shape substantially concentric with the outer peripheral wall surface 422F of the second inner diameter side magnet insertion hole 422.

[Comparison of q-Axis Inductance]

Figure 3:
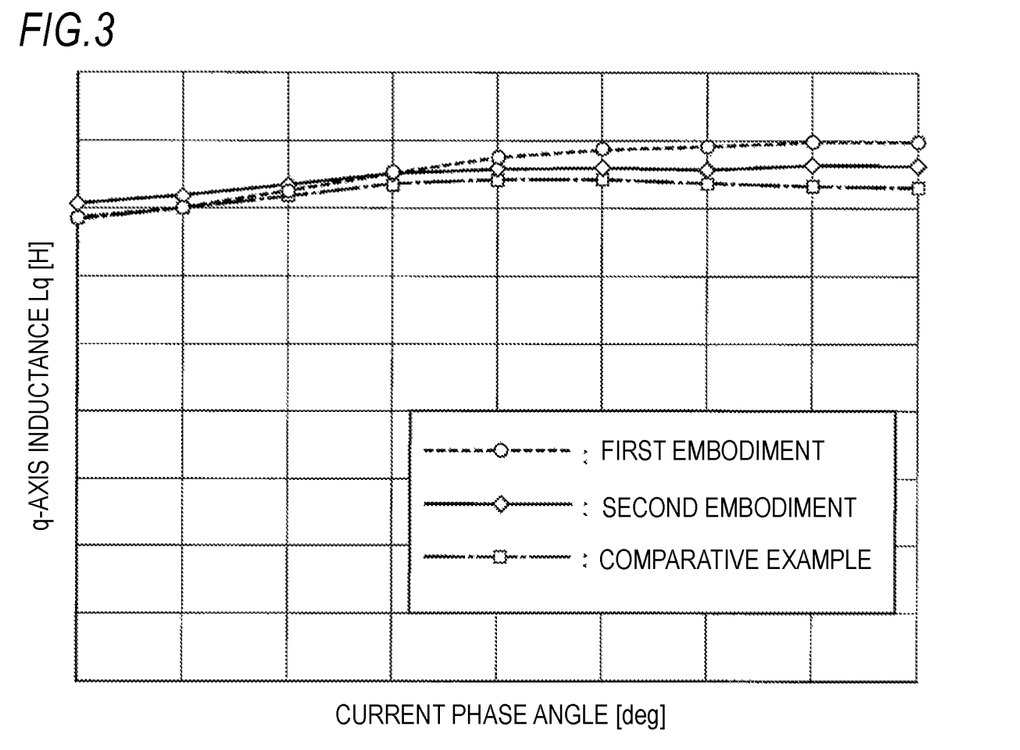
FIG. 3 is a graph illustrating q-axis inductance in the rotors according to the first embodiment, the second embodiment, and the comparative example of the present invention.

FIG. 3 is a graph illustrating a q-axis inductance Lq of the rotors in the first embodiment, the second embodiment, and the comparative example. The comparative example illustrated in FIG. 3 indicates a case where the left outer diameter wall 71f and the right outer diameter wall 71g of the first refrigerant flow path hole 71 are substantially linear. In the first embodiment, the second embodiment, and the comparative example, the configuration, shape, and arrangement of the magnetic pole portion 30 and the second refrigerant flow path hole 72 are the same, and the shape and arrangement of the left end portion 71a, the right end portion 71b, the outer diameter side apex 71c, the inner diameter side apex 71d, and the inner diameter wall 71h of the first refrigerant flow path hole 71 are the same. That is, the first embodiment, the second embodiment, and the comparative example differ only in the shapes of the left outer diameter wall 71f and the right outer diameter wall 71g of the first refrigerant flow path hole 71.

As illustrated in FIG. 3, in the first embodiment and the second embodiment, the q-axis inductance Lq is larger than that of the comparative example over the whole regardless of the current phase angle. Further, when the current phase angle is equal to or larger than a predetermined angle, the first embodiment has the q-axis inductance Lq that is particularly larger than that of the second embodiment and the comparative example.

Modification, improvement, and the like of the above-described embodiments can be made as appropriate.

For example, in the present embodiment, the first refrigerant flow path hole 71 and the second refrigerant flow path hole 72 are configured such that the refrigerant that is a liquid medium flows, but may be a hollow hole in which the liquid medium does not flow. Even in this case, the magnet part 300 that constitutes the magnetic pole portion 30 can be cooled by air or the like flowing through the hollow hole.

Further, the first inner diameter side arc magnet 821 and the second inner diameter side arc magnet 822 of the inner diameter side magnet part 320 can be omitted. That is, the magnet part 300 may be configured only by the outer diameter side arc magnet 810 of the outer diameter side magnet part 310.

In addition, at least the following matters are described in this specification. In addition, although the corresponding components and the like in the above-described embodiment are illustrated in parenthesis, the present invention is not limited thereto.

(1) A rotor (rotor 10) including
a rotor core (rotor core 20) including a rotor shaft hole (rotor shaft hole 21) in which a rotor shaft is fastened, a plurality of magnet insertion holes (first inner diameter side magnet insertion hole 421 and second inner diameter side magnet insertion hole 422) provided along the circumferential direction, and a hollow hole (first refrigerant flow path hole 71) provided between the rotor shaft hole and the magnet insertion holes in the radial direction,
a plurality of magnetic pole portions (magnetic pole portions 30) constituted by permanent magnets (first inner diameter side arc magnet 821 and second inner diameter side arc magnet 822) inserted into the magnet insertion holes; in which
the hollow hole
includes an intersection (intersection X) of the q-axis of each magnetic pole portion and a virtual circle (virtual circle VC) passing through the innermost diameter portion of the magnet insertion holes around the axial center (axial center C) of the rotor core, and
is disposed to face the magnet insertion holes of adjacent magnetic pole portions.

According to (1), the hollow hole is formed to include an intersection of the q-axis of each magnetic pole portion and a virtual circle passing through the innermost diameter portion of the magnet insertion holes around the axial center of the rotor core. As a result, the stress generated in the rotor core due to the tightening load of the rotor shaft can be absorbed by the hollow hole, and the stress generated in the magnetic pole portion due to the tightening load of the rotor shaft can be reduced. Further, since the hollow hole is disposed so as to face the magnet insertion holes of adjacent magnetic pole portions, the permanent magnet constituting the magnetic pole portion can be cooled by air or the like flowing through the hollow hole.

(2) The rotor according to (1), in which the hollow hole is disposed at a position where an outer diameter side apex (outer diameter side apex 71*c*) intersects the virtual circle.

According to (2), since the distance from the center of the rotor core at the outer diameter side apex of the hollow hole and the distance from the center of the rotor core at the innermost diameter portion of the magnet insertion hole are substantially equal, the stress due to the tightening load of the rotor shaft can be distributed and received at the outer diameter side apex of the hollow hole and the innermost diameter portion of the magnet insertion hole.

(3) The rotor according to (1) or (2), in which the hollow hole includes a first end portion (left end portion 71*a*) and a second end portion (right end portion 71*b*) that form both end portions in the circumferential direction;

an outer diameter side apex (outer diameter side apex 71*c*) that has a longer radial distance from the axial center of the rotor core than the first end portion and the second end portion, and forms an apex on the outer side in the radial direction; and an outer diameter wall (outer diameter wall 71*e*) that includes a first outer diameter wall (left outer diameter wall 71*f*) extending from the first end portion to the outer diameter side apex, and a second outer diameter wall (right outer diameter wall 71*g*) extending from the second end portion to the outer diameter side apex, and the first outer diameter wall and the second outer diameter wall have a shape along the inner diameter wall surface (outer peripheral wall surfaces 421F and 422F) of the opposing magnet insertion hole, or a curved shape that protrudes toward the center side of the hollow hole than the inner side wall surface of the opposing magnet insertion hole.

According to (3), since the first outer diameter wall and the second outer diameter wall of the hollow hole have a shape along the inner wall surface of the opposing magnet insertion hole, or a curved shape that protrudes toward the center side of the hollow hole than the inner wall surface of the opposing magnet insertion hole, the width of the q-axis magnetic path through which the q-axis magnetic flux flows is ensured, and a decrease in q-axis inductance can be suppressed.

(4) The rotor according to (3), in which the inner diameter wall surface of the magnet insertion hole of each magnetic pole portion has a curved shape that protrudes toward the inner side of the rotor core in the radial direction, and the first outer diameter wall and the second outer diameter wall of the hollow hole have a shape along the inner diameter wall surface of the opposing magnet insertion hole, or a curved shape that protrudes toward the center side of the hollow hole than the inner diameter wall surface of the opposing magnet insertion hole.

According to (4), since the inner diameter wall surface of the magnet insertion hole of each magnetic pole portion has a curved shape that protrudes toward the inner side of the rotor core in the radial direction, and the first outer diameter wall and the second outer diameter wall of the hollow hole have a shape along the inner wall surface of the opposing magnet insertion hole, or a curved shape that protrudes toward the center side of the hollow hole than the inner wall surface of the opposing magnet insertion hole, the q-axis magnetic path can be made in a shape along the flow of the q-axis magnetic flux and a decrease in q-axis inductance can be suppressed.

(5) The rotor according to (3) or (4), in which the first outer diameter wall and the second outer diameter wall of the hollow hole have a curved shape that protrudes toward the center side of the hollow hole than the inner diameter wall surface of the opposing magnet insertion hole, and the distances (distances D71*f* and D71*g*) between the first outer diameter wall and the second outer diameter wall, and the opposing magnet insertion hole are longer than the distance (distances D22 and D21) between the q-axis and the magnet insertion hole on the outer side of the magnet insertion hole in the radial direction.

According to (5), since the first outer diameter wall and the second outer diameter wall of the hollow hole have a curved shape that protrudes toward the center side of the hollow hole than the inner diameter wall surface of the opposing magnet insertion hole and the distances between the first outer diameter wall and the second outer diameter wall, and the opposing magnet insertion hole are longer than the distance between the q-axis and the magnet insertion holes on the outer side of the magnet insertion hole in the radial direction, the magnetic path through which q-axis magnetic flux flows can be secured more effectively.

The invention claimed is:

1. A rotor comprising:
   a rotor core including a rotor shaft hole in which a rotor shaft is fastened, a plurality of magnet insertion holes provided along the circumferential direction, and a hollow hole provided between the rotor shaft hole and the magnet insertion holes in the radial direction; and
   a plurality of magnetic pole portions constituted by permanent magnets inserted into the magnet insertion holes, wherein:
   the hollow hole includes an intersection of the q-axis of each magnetic pole portion and a virtual circle passing through the innermost diameter portion of the magnet insertion holes around the axis of the rotor core;
   the hollow hole is disposed to face the magnet insertion holes of adjacent magnetic pole portions;
   the hollow hole includes:
     a first end portion and a second end portion that form both end portions in the circumferential direction;
     an outer diameter side apex that has a longer radial distance from the axial center of the rotor core than the first end portion and the second end portion, and forms an apex on the outer side in the radial direction; and
     an outer diameter wall that includes a first outer diameter wall extending from the first end portion to the outer diameter side apex, and a second outer diameter wall extending from the second end portion to the outer diameter side apex;
   the first outer diameter wall and the second outer diameter wall have a shape along the inner diameter wall surface of the opposing magnet insertion hole, or a curved shape that protrudes toward the center side of the hollow hole than the inner side wall surface of the opposing magnet insertion hole;
   the inner diameter wall surface of the magnet insertion hole of each magnetic pole portion has a curved shape that protrudes toward the inner side of the rotor core in the radial direction; and
   the first outer diameter wall and the second outer diameter wall of the hollow hole have a shape along the inner diameter wall surface of the opposing magnet insertion hole, or a curved shape that protrudes toward the center side of the hollow hole than the inner diameter wall surface of the opposing magnet insertion hole.

2. The rotor according to claim 1, wherein the hollow hole is disposed at a position where the outer diameter side apex intersects the virtual circle.

3. The rotor according to claim 1, wherein:
the first outer diameter wall and the second outer diameter wall of the hollow hole have a curved shape that protrudes toward the center side of the hollow hole than the inner diameter wall surface of the opposing magnet insertion hole; and
the distances between the first outer diameter wall and the second outer diameter wall, and the opposing magnet insertion hole are longer than the distance between the q-axis and the magnet insertion holes on the outer side of the magnet insertion hole in the radial direction.

4. The rotor according to claim 1, wherein:
the magnet insertion holes include: a pair of inner diameter side magnet insertion holes extending outward in the radial direction across a d-axis; and an outer diameter side magnet insertion hole formed to cross the d-axis; and
the outer diameter side magnet insertion hole has a curved shape.

5. The rotor according to claim 4, wherein
a curved direction defined by the inner diameter side magnet insertion holes and a curved direction of the outer diameter side magnet insertion hole are in the same direction.

\* \* \* \* \*